United States Patent
Lee

(10) Patent No.: US 11,524,606 B2
(45) Date of Patent: Dec. 13, 2022

(54) VEHICLE FLOOR STRUCTURE

(71) Applicants: HYUNDAI MOTOR COMPANY, Seoul (KR); KIA MOTORS CORPORATION, Seoul (KR)

(72) Inventor: Hyo Sang Lee, Gwangmyeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 267 days.

(21) Appl. No.: 17/092,430

(22) Filed: Nov. 9, 2020

(65) Prior Publication Data

US 2021/0387550 A1    Dec. 16, 2021

(30) Foreign Application Priority Data

Jun. 15, 2020  (KR) .................... 10-2020-0072556

(51) Int. Cl.
| | |
|---|---|
| *B60J 7/00* | (2006.01) |
| *B60N 2/01* | (2006.01) |
| *B60K 1/04* | (2019.01) |
| *B60L 50/60* | (2019.01) |

(52) U.S. Cl.
CPC .............. *B60N 2/012* (2013.01); *B60K 1/04* (2013.01); *B60L 50/66* (2019.02); *B60K 2001/0422* (2013.01); *B60K 2001/0438* (2013.01)

(58) Field of Classification Search
CPC ... B60K 1/04; B60K 2001/0438; Y02T 10/70; B62D 25/20; Y02E 60/10; Y02E 60/50; A61P 43/00; H05K 1/165
See application file for complete search history.

(56) References Cited

U.S. PATENT DOCUMENTS

| | | | | |
|---|---|---|---|---|
| 8,336,658 B2 * | 12/2012 | Rawlinson | ............... | B60K 1/04 |
| | | | | 429/96 |
| 8,561,743 B2 * | 10/2013 | Iwasa | ..................... | B62D 25/20 |
| | | | | 180/68.5 |
| 8,657,058 B2 * | 2/2014 | Takagi | ................. | B60K 17/356 |
| | | | | 180/68.5 |
| 9,160,042 B2 * | 10/2015 | Fujii | .................... | H01M 10/625 |
| 9,321,338 B2 * | 4/2016 | Naruke | .................... | B60K 1/04 |
| 9,321,416 B2 * | 4/2016 | Kinoshita | ............. | H01M 50/20 |
| 9,956,861 B2 * | 5/2018 | Nomura | ............... | B62D 23/005 |
| 11,285,796 B2 * | 3/2022 | Choi | .................... | B62D 21/155 |
| 11,370,287 B2 * | 6/2022 | Tsuyuzaki | ............ | B62D 21/157 |
| 2021/0170915 A1 * | 6/2021 | Park | ...................... | B62D 25/025 |
| 2021/0178883 A1 * | 6/2021 | Kang | .................... | B62D 21/157 |
| 2021/0323609 A1 * | 10/2021 | Sasaki | ................... | B62D 21/157 |
| 2021/0387672 A1 * | 12/2021 | Choi | ................ | B62D 25/2036 |
| 2022/0016966 A1 * | 1/2022 | Kecalevic | ............ | B62D 25/025 |
| 2022/0017152 A1 * | 1/2022 | Kecalevic | ........... | H01M 50/249 |
| 2022/0081040 A1 * | 3/2022 | Choi | ........................ | B60K 1/04 |

* cited by examiner

*Primary Examiner* — Kiran B Patel
(74) *Attorney, Agent, or Firm* — Morgan, Lewis & Bockius LLP

(57) ABSTRACT

A floor structure for a vehicle includes: a center floor; a plurality of longitudinal members attachably disposed on a top surface of the center floor; a plurality of seat rails disposed in the plurality of longitudinal members, respectively; and a battery assembly arranged under the center floor.

12 Claims, 5 Drawing Sheets

VEHICLE FLOOR STRUCTURE

CROSS-REFERENCE TO RELATED APPLICATION

This application is based on and claims the benefit of priority to Korean Patent Application No. 10-2020-0072556, filed on Jun. 15, 2020, in the Korean Intellectual Property Office, the disclosure of which is incorporated herein in its entirety by reference.

TECHNICAL FIELD

The present disclosure relates to a vehicle floor structure, and more particularly, to a vehicle floor structure capable of securing a relatively large space in a passenger compartment by minimizing a height of a carpet covering a center floor.

BACKGROUND

In recent years, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a battery assembly which is mounted to a vehicle body. The battery assembly includes one or more battery cells (or battery modules), electric/electronic components associated with the battery cells, and a battery case in which the battery cells and the electric/electronic components are mounted. The battery case includes an upper case and a lower case. The battery assembly may be mounted under a center floor of the vehicle body.

In order to secure a larger passenger compartment and improve the interior design, research and development are being conducted to apply a flat floor, hidden seat rails, etc. to electric vehicles.

However, a conventional electric vehicle has a relatively high floor height for the installation of the battery assembly compared to an internal combustion engine vehicle. As a result, the height of a carpet covering the center floor, seat crossmembers, and the seat rails and the total height of the vehicle may be increased.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle floor structure capable of securing a relatively large space in a passenger compartment by minimizing a height of a carpet covering a center floor.

According to an aspect of the present disclosure, a floor structure for a vehicle may include: a center floor; a plurality of longitudinal members attachably disposed on a top surface of the center floor; a plurality of seat rails disposed in the plurality of longitudinal members, respectively; and a battery assembly arranged under the center floor.

Each longitudinal member may extend in a longitudinal direction of the vehicle to connect a vehicle front structure and a vehicle rear structure.

Each longitudinal member may have a front end extending toward to be in contact with a dash panel and a rear end extending toward to be in contact with a rear floor, the dash panel may be disposed on a front end of the center floor, and the rear floor may be disposed on a rear end of the center floor.

The vehicle floor structure may further include a plurality of seat crossmembers attachably disposed on the top surface of the center floor. Each longitudinal member may extends through each seat crossmember so that the plurality of longitudinal members and the plurality of seat crossmembers may be connected to intersect with each other.

A top surface of the seat crossmember may be flush with a top surface of the longitudinal member. That is, the top surface of the seat crossmember may be at same level as a top surface of the longitudinal member in vertical of the vehicle.

The battery assembly may include: a battery case; a plurality of battery crossmembers fixed to an interior space of the battery case; and a battery longitudinal member intersecting with the plurality of battery crossmembers. A top surface of each battery crossmember may be aligned with a top surface of the battery case, and each of the plurality of battery crossmembers may be fastened to the seat rail through a rail fastener.

The vehicle floor structure may further include: a reinforcing member received in a cavity of the seat crossmember; and a support bracket attached to the top surface of the center floor. The reinforcing member may be arranged above the support bracket.

The battery case may be configured to be mounted to the center floor by a through bolt and a nut. The through bolt may extends through the battery case, the nut may be interposed between the support bracket and the reinforcing member, and the through bolt may be configured to screw into the nut.

A top end of the through bolt may be extends through a cavity of the reinforcing member so that the through bolt may be supported to the reinforcing member.

The reinforcing member and the seat rail may be alternately arranged in a width direction of the vehicle.

Each longitudinal member may include: a top wall; a pair of sidewalls extending from both side edges of the top wall toward the center floor, respectively; and a pair of flanges extending from the pair of sidewalls, respectively. The top wall may have an opening, and the pair of flanges may be configured to extend toward to be in contact with the top surface of the center floor.

The reinforcing member may include: a bottom wall; a pair of sidewalls extending from both side edges of the bottom wall toward the seat crossmember, respectively; and a pair of flanges extending from the pair of sidewalls, respectively. The pair of flanges may be configured to extend toward to be in contact with the seat crossmember.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
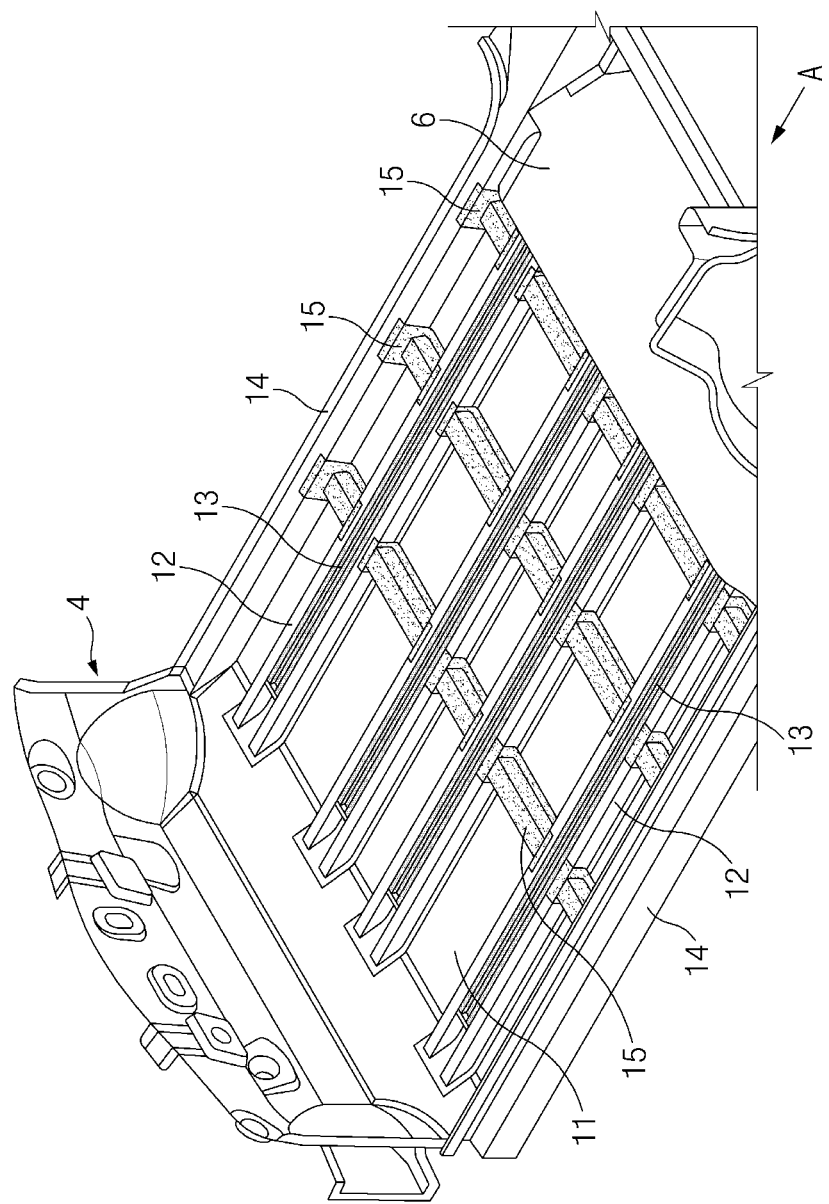
FIG. 1 illustrates a perspective view of a vehicle floor structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
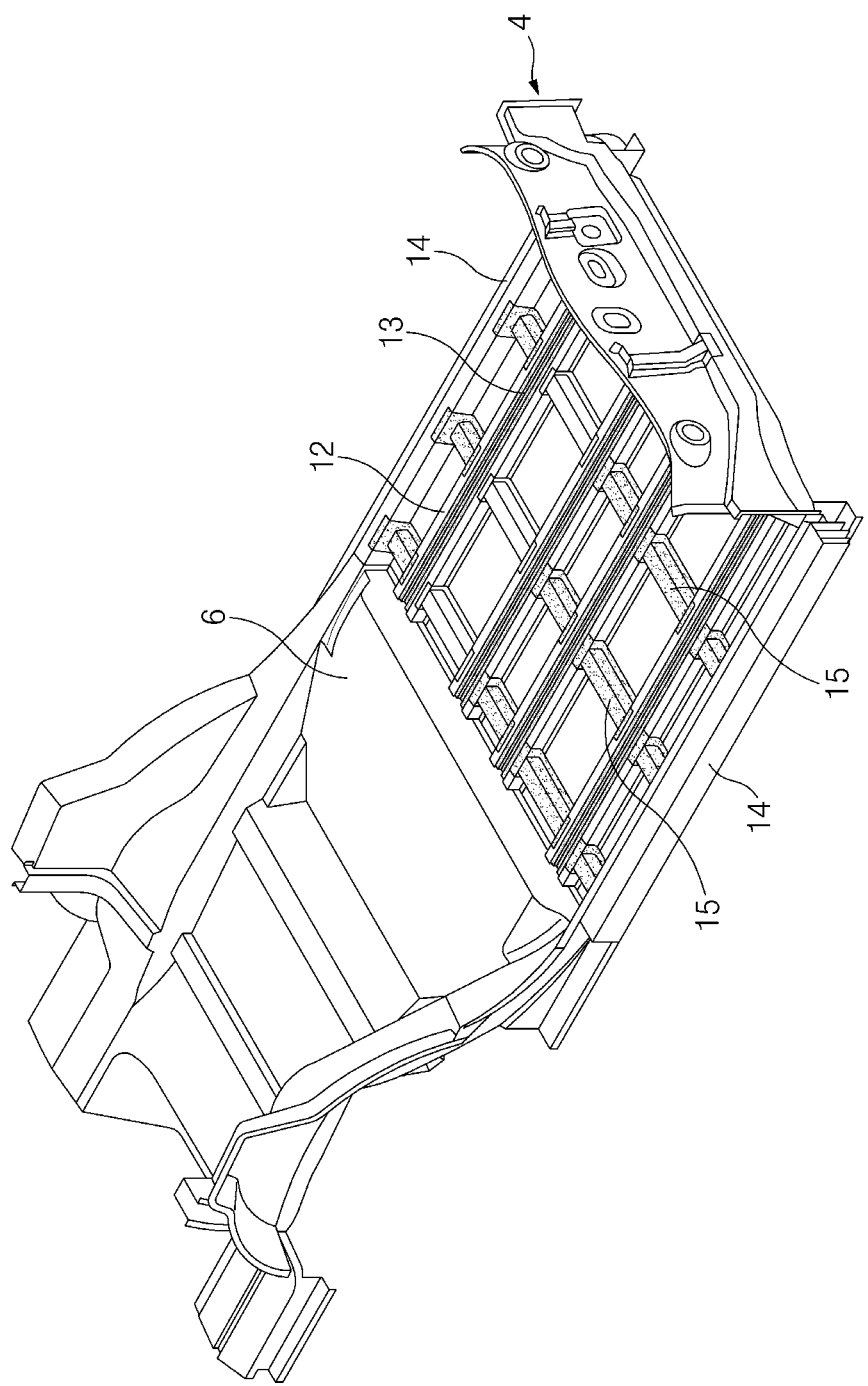
FIG. 2 illustrates a rear perspective view of the vehicle floor structure when viewed from a direction indicated by arrow A of FIG. 1.

Referring to FIGS. 1 and 2, a vehicle floor structure according to an exemplary embodiment of the present disclosure may include a center floor 11 disposed on the bottom of a vehicle body, a plurality of longitudinal members 12 attached to a top surface of the center floor 11, a plurality of seat rails 13 inserted into the plurality of longitudinal members 12, respectively, and a battery assembly 20 disposed under the center floor 11.

A dash panel 4 may be disposed on a front end of the center floor 11, and a rear floor 6 may be disposed on a rear end of the center floor 11.

A pair of side sills 14 may be attached to both side edges of the center floor 11, respectively, and thus the pair of side sills 14 may be spaced apart from each other in a width direction of the center floor 11. Each side sill 14 may extend in a longitudinal direction of the vehicle.

The plurality of longitudinal members 12 may be attached to the top surface of the center floor 11 using fasteners, welding, and/or the like. Each longitudinal member 12 may extend in the longitudinal direction of the vehicle, and the plurality of longitudinal members 12 may be spaced apart from each other in a width direction of the vehicle.

Each longitudinal member 12 may extend in the longitudinal direction of the vehicle to connect a vehicle front structure and a vehicle rear structure, and thus each longitudinal member 12 may define a load path parallel to a longitudinal axis of the vehicle. The vehicle front structure may be a structure disposed in front of the center floor 11, and the vehicle front structure may include the dash panel 4, front side members (not shown), and the like. The vehicle rear structure may be a structure disposed behind the center floor 11, and the vehicle rear structure may include the rear floor 6, rear side members (not shown), and the like.

Referring to FIGS. 1 and 2, a front end of the longitudinal member 12 may be joined to the dash panel 4 of the vehicle front structure by welding, using fasteners, and/or the like. A crossmember or a kick up portion extending in the width direction of the vehicle may be disposed on the front of the rear floor 6, and a rear end of the longitudinal member 12 may be joined to the crossmember or the kick up portion of the rear floor 6 of the vehicle rear structure by welding, using fasteners, and/or the like. That is, the plurality of longitudinal members 12 may connect the center floor 11, the dash panel 4, and the rear floor 6, thereby significantly improving stiffness of the vehicle body.

A plurality of seat crossmembers 15 may be attached to the top surface of the center floor 11 using fasteners, welding, and/or the like, and each seat crossmember 15 may extend in the width direction of the vehicle. The seat crossmembers 15 may be perpendicular to the longitudinal members 12, and the longitudinal members 12 may pass through the seat crossmembers 15, and thus the plurality of longitudinal members 12 and the plurality of seat crossmembers 15 may be connected to intersect with each other.

Figure 4:
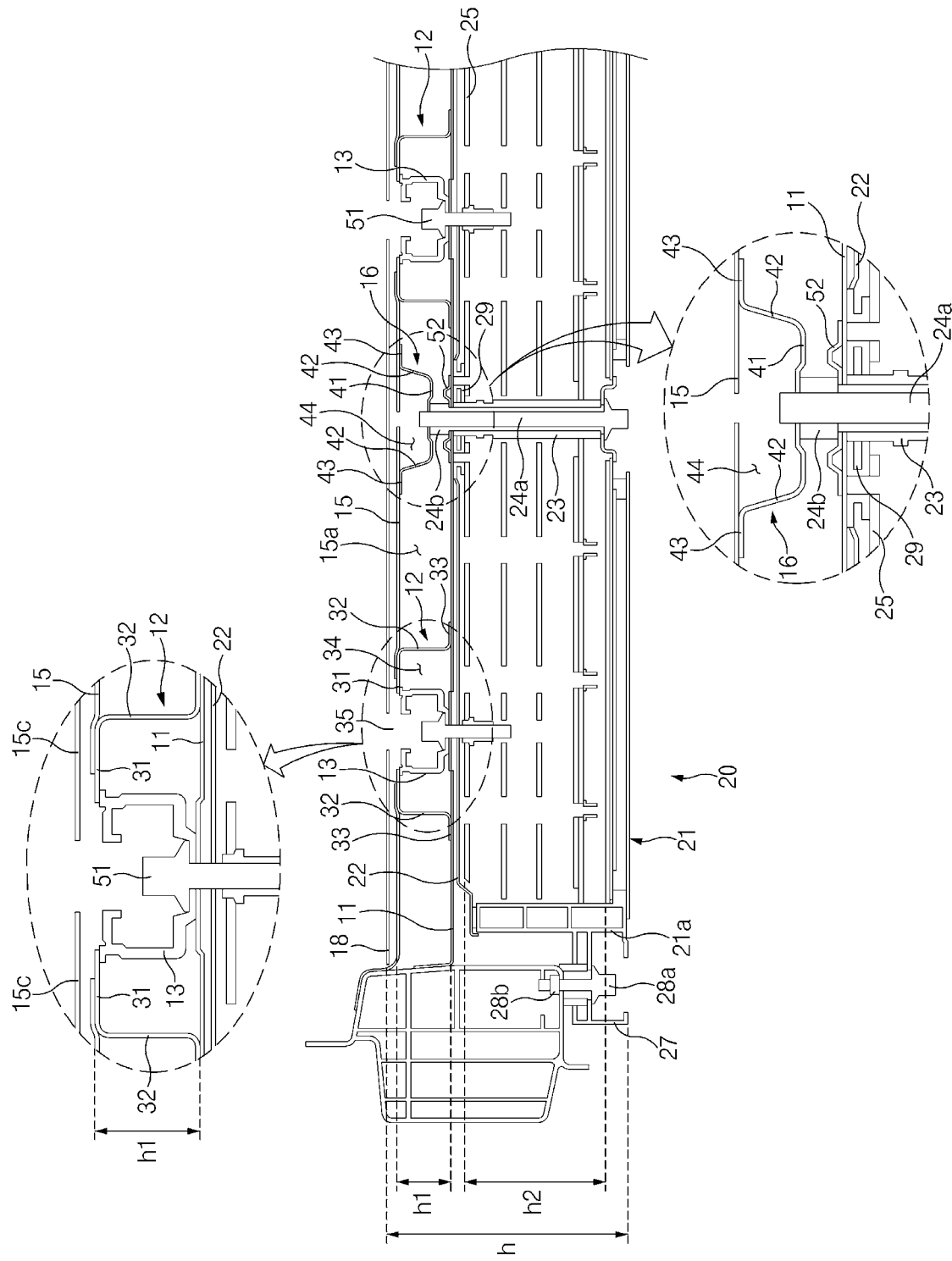
FIG. 4 illustrates a cross-sectional view taken along line B-B of FIG. 3.

Referring to FIG. 4, each seat crossmember 15 may have a flange 15c horizontally extending. The flange 15c may be raised upwardly from a top surface of the seat crossmember 15, and the flange 15c may be joined to a top surface of the longitudinal member 12 by welding, using fasteners, and/or the like. The top surface of the seat crossmember 15 may be flush with the top surface of the longitudinal member 12. That is, a top surface of the seat crossmember 15 is at a same level as a top surface of the longitudinal member 12 in a vertical direction of the vehicle. The longitudinal member 12 and the seat crossmember 15 may have the same height h1, and thus a carpet 18 may evenly cover the plurality of seat crossmembers 15 and the plurality of longitudinal members 12. The carpet 18 may cover the center floor 11, thereby forming a flat floor.

Referring to FIG. 4, each longitudinal member 12 may include a top wall 31, a pair of sidewalls 32 extending from both side edges of the top wall 31, respectively, and a pair of flanges 33 extending from the pair of sidewalls 32, respectively. The top wall 31 may face a passenger compartment, and each sidewall 32 may extend vertically from the corresponding edge of the top wall 31 toward the center floor 11. Each flange 33 may extend horizontally from a bottom end of the corresponding sidewall 32. Each flange 33 may be extend toward to be in contact with the top surface of the center floor 11. Each flange 33 may be joined to the top surface of the center floor 11 using fasteners, welding, and/or the like. Each longitudinal member 12 may have a cavity 34 defined by the top wall 31 and the pair of sidewalls 32, and the top wall 31 may have an opening 35.

Each seat rail 13 may be received in the cavity 34 of the corresponding longitudinal member 12 through the opening 35. For example, top edges of the seat rail 13 may be joined to the top wall 31 of the longitudinal member 12 by welding and/or the like, and a bottom surface of the seat rail 13 may be joined to the top surface of the center floor 11 using fasteners, welding, and/or the like. In particular, the seat rail 13 may be firmly fastened to the center floor 11 and the battery assembly 20 through a rail fastener 51. The seat rail 13 may be attached to the top surface of the center floor 11, and the battery assembly 20 may be disposed under the center floor 11.

As the seat rail 13 is received in the cavity 34 of the longitudinal member 12, a height h from the bottom of the battery assembly 20 to a top surface of the carpet 18 may be minimized compared to the related art, thereby securing a relatively large space in the passenger compartment. In addition, stiffness of the longitudinal member 12 and stiffness of the seat rail 13 may be improved, and the capacity of the battery assembly 20 may be relatively increased. In particular, as the seat rail 13 is received in the longitudinal member 12, exposure of the seat rail 13 may be minimized, so that exterior styling may be improved.

The battery assembly 20 may include one or more battery cells (or battery modules), electric/electronic components associated with the battery cells, a battery case 21 in which the battery cells and the electric/electronic components are mounted, and a cover 22 covering the top of the battery case 21.

Figure 5:
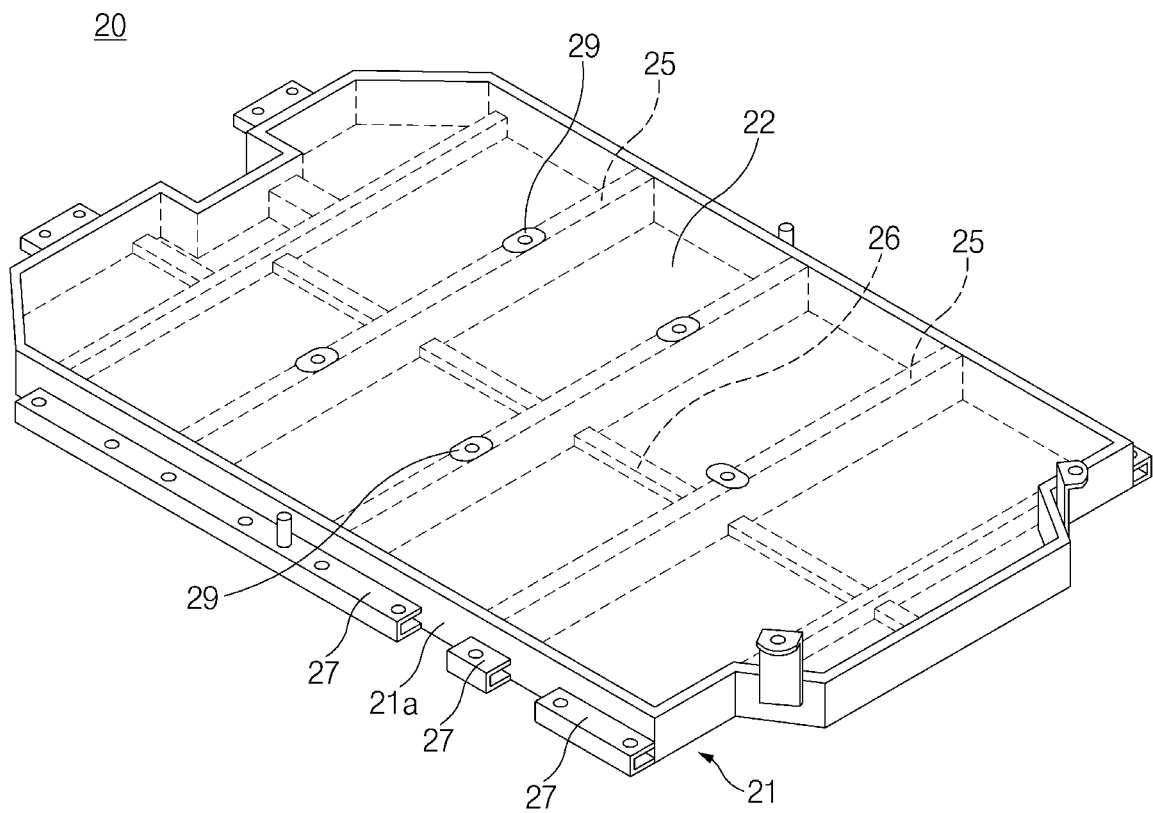
FIG. 5 illustrates a perspective view of a battery assembly of a vehicle floor structure according to an exemplary embodiment of the present disclosure.

Referring to FIGS. 4 and 5, the battery assembly 20 may include a plurality of battery crossmembers 25 and a battery longitudinal member 26 which are fixed to an interior space of the battery case 21. Each battery crossmember 25 may extend in a width direction of the battery case 21, and the battery longitudinal member 26 may extend in a longitudinal direction of the battery case 21. The plurality of battery crossmembers 25 may be spaced apart from each other in the longitudinal direction of the battery case 21 in the interior space of the battery case 21. The battery longitudinal member 26 may intersect with the plurality of battery crossmembers 25 in the interior space of the battery case 21. Stiffness and strength of the battery case 21 may be improved by the plurality of battery crossmembers 25 and the battery longitudinal member 26.

A top surface of the battery crossmember 25 may be aligned with a top surface of the battery case 21 or the cover 22. As a height h2 of the battery crossmember 25 is increased compared to the related art, a cross-sectional area of the battery crossmember 25 may be increased compared to the related art. Thus, stiffness and strength of the battery case 21 and the vehicle body may be increased, and crashworthiness of the vehicle against a side impact/collision may be improved. In particular, as the top surface of the battery crossmember 25 is close to the seat rail 13, the installation of the rail fastener 51 may be simplified, and the battery crossmember 25 and the seat rail 13 may be more firmly fastened to the center floor 11 by the rail fastener 51.

According to an exemplary embodiment, the top surface of the battery crossmember 25 may be flush with the top surface of the battery case 21 as illustrated in FIG. 4.

The battery assembly 20 may include side mounts 27 extending from sidewalls 21a of the battery case 21 toward the side sills 14, respectively, and each side mount 27 may be fastened to the side sill 14 by a mounting bolt 28a and a nut 28b.

Referring to FIG. 4, the battery case 21 may be mounted to the center floor 11 by a through pipe 23, a through bolt 24a, and a nut 24b. A cap 29 may be mounted on the top surface of the battery crossmember 25, and the through pipe 23 and the through bolt 24a may extend vertically in a height direction of the battery case 21. The through pipe 23 may pass through the battery crossmember 25 and the cap 29, and the through bolt 24a may pass through the inside of the through pipe 23, and thus the through bolt 24a may pass through the battery case 21 and the center floor 11. The nut 24b may be mounted on the top surface of the center floor 11 through a support bracket 52 by welding, using fasteners, and/or the like. The support bracket 52 may be joined to the top surface of the center floor 11 using fasteners, welding, and/or the like, and the nut 24b may be fixed to a top surface of the support bracket 52 by welding and/or the like. The through bolt 24a passing through the battery case 21 may be screwed into the nut 24b so that the battery case 21 may be joined to the center floor 11.

Figure 3:
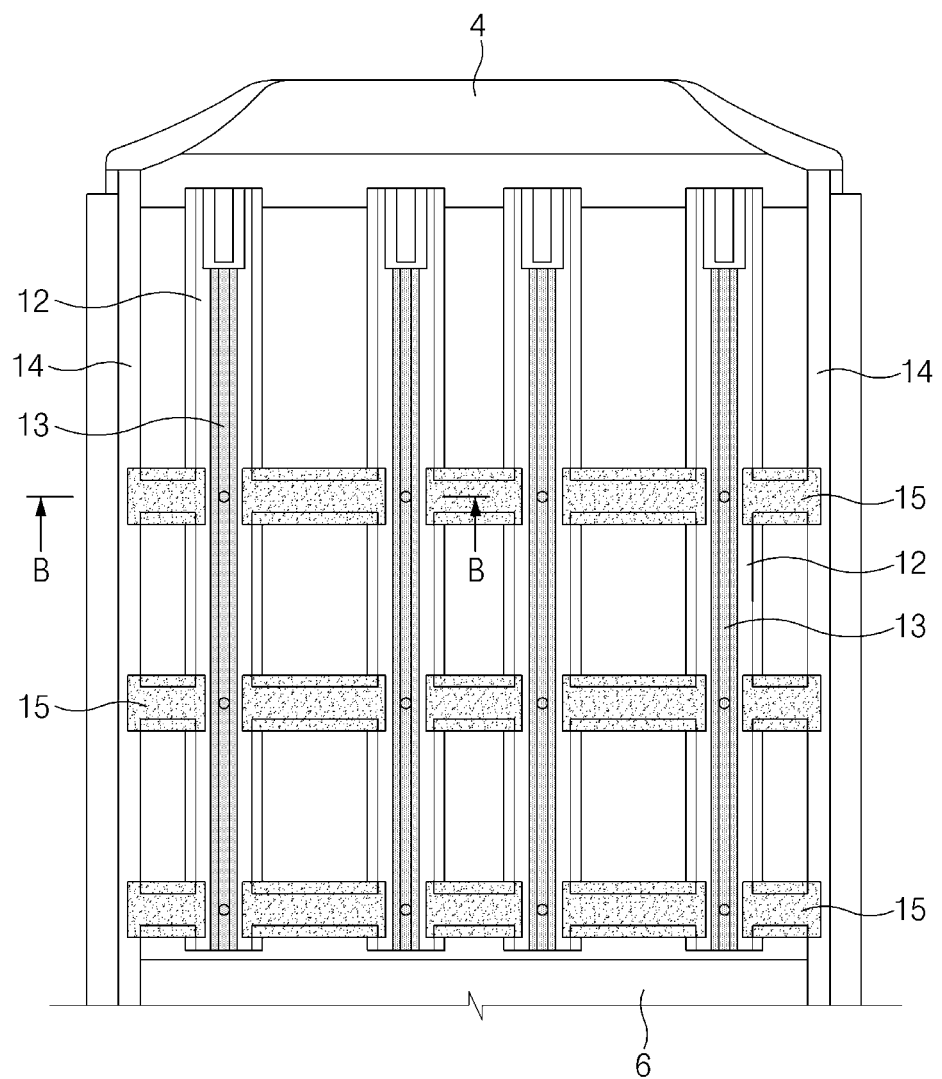
FIG. 3 illustrates a plan view of a vehicle floor structure according to an exemplary embodiment of the present disclosure.

Referring to FIGS. 3 and 4, a reinforcing member 16 may be received in a cavity 15a of the seat crossmember 15. The reinforcing member 16 may be attached to a top wall of the seat crossmember 15 by welding, using fasteners, and/or the like. The reinforcing member 16 may include a bottom wall 41, a pair of sidewalls 42 extending from both side edges of the bottom wall 41, respectively, and a pair of flanges 43 extending from the pair of sidewalls 42, respectively. The bottom wall 41 may face the battery assembly 20, and each sidewall 42 may extend vertically from the corresponding edge of the bottom wall 41 toward the top wall of the seat crossmember 15. The reinforcing member 16 may have a cavity 44 defined by the bottom wall 41 and the pair of sidewalls 42. Each flange 43 may extend horizontally from a top end of the corresponding sidewall 42. Each flange 43 may extend toward to be in contact with the top wall of the seat crossmember 15. As the flanges 43 of the reinforcing member 16 are joined to the top wall of the seat crossmember 15 using fasteners, welding, and/or the like, the reinforcing member 16 may be located in an upper space within the cavity 15a of the seat crossmember 15. The support bracket 52 may be attached to the top surface of the center floor 11 by welding, using fasteners, and/or the like, and the support bracket 52 may be located in a lower space within the cavity 15a of the seat crossmember 15. Thus, the reinforcing member 16 may be located above the support bracket 52. As a top end of the through bolt 24a passes through the reinforcing member 16 and is inserted into the cavity 44 of the reinforcing member 16, the through bolt 24a may be supported to the reinforcing member 16. In particular, the nut 24b may be interposed between the reinforcing member 16 and the support bracket 52. Specifically, a top surface of the nut 24b may be joined to the bottom wall 41 of the reinforcing member 16 by welding and/or the like, and a bottom surface of the nut 24b may be joined to the top surface of the support bracket 52 by welding and/or the like. The through bolt 24a may increase its clamping force by the reinforcing member 16, thereby improving mount stiffness of the battery case 21. The reinforcing member 16 may be located between the two seat rails 13 adjacent in the width direction of the vehicle. Thus, the reinforcing members 16 and the seat rails 13 may be alternately arranged in the width direction of the vehicle.

According to exemplary embodiments of the present disclosure, as the seat rails 13 are received in the cavities 34 of the longitudinal members 12, the height h of the carpet 18 may be minimized compared to the related art to thereby achieve a relatively large space in the passenger compartment, and the capacity of the battery assembly 20 may be relatively increased. In particular, as the seat rails 13 are received in the longitudinal members 12, the exposure of the seat rails 13 may be minimized, and thus exterior styling may be improved.

In addition, according to exemplary embodiments of the present disclosure, the top surface of the battery crossmember 25 may be aligned with the top surface of the battery case 21 or the cover 22. Since the height h2 of the battery crossmember 25 is relatively increased compared to the related art, the cross-sectional area of the battery crossmember 25 may be increased compared to the related art. Thus, the stiffness and strength of the battery case 21 and the vehicle body may be increased, and the crashworthiness of the vehicle against a side impact/collision may be improved.

Since the top surfaces of the battery crossmembers 25 are aligned with the top surface of the battery case 21 or the cover 22, the plurality of seat rails 13 located above the center floor 11 and the battery crossmembers 25 located below the center floor 11 may be close to each other, and thus the installation of the rail fasteners 51 may be simplified, and the battery crossmembers 25 and the seat rails 13 may be more firmly fastened to the center floor 11 by the rail fasteners 51.

As set forth above, according to exemplary embodiments of the present disclosure, as the vehicle floor structure has the longitudinal members mounted on the top surface of the center floor, and the seat rails received in the cavities of the longitudinal members, thereby significantly reducing the height of the carpet compared to the related art to achieve a relatively large space in the passenger compartment, improving the stiffness of the longitudinal members and the stiffness of the seat rails, and relatively increasing the capacity of the battery assembly. In particular, as the seat rails are received in the longitudinal members, the exposure of the seat rails may be minimized, and thus exterior styling may be improved.

According to exemplary embodiments of the present disclosure, the top surface of the battery crossmember may be aligned with the top surface of the battery case or the cover, and thus the height and cross-sectional area of the battery crossmember may be relatively increased compared to the related art. Thus, the stiffness and strength of the battery case and the vehicle body may be increased, and the crashworthiness of the vehicle against side impacts/collisions may be improved.

According to exemplary embodiments of the present disclosure, as the top surfaces of the battery crossmembers are flush with the top surface of the battery case or the cover, the plurality of seat rails located above the center floor and the battery crossmembers located below the center floor may be close to each other, making the installation of the rail fasteners easy. The battery crossmembers and the seat rails may be more firmly fastened to the center floor by the rail fasteners.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A floor structure for a vehicle, comprising:
   a center floor;
   a plurality of longitudinal members attachably disposed on a top surface of the center floor;
   a plurality of seat rails disposed in the plurality of longitudinal members, respectively; and
   a battery assembly arranged under the center floor.

2. The floor structure according to claim 1, wherein each longitudinal member extends in a longitudinal direction of the vehicle to connect a vehicle front structure and a vehicle rear structure.

3. The floor structure according to claim 1, wherein each longitudinal member has a front end extending toward to be in contact with a dash panel and a rear end extending toward to be in contact with a rear floor,
   wherein the dash panel is disposed on a front end of the center floor, and
   wherein the rear floor is disposed on a rear end of the center floor.

4. The floor structure according to claim 1, further comprising a plurality of seat crossmembers attachably disposed on the top surface of the center floor,
   wherein each longitudinal member extends through each seat crossmember so that the plurality of longitudinal members and the plurality of seat crossmembers are connected to intersect with each other.

5. The floor structure according to claim 4, wherein a top surface of the seat crossmember is at a same level as a top surface of the longitudinal member in a vertical direction of the vehicle.

6. The floor structure according to claim 4, wherein the battery assembly includes:
   a battery case;
   a plurality of battery crossmembers fixed to an interior space of the battery case; and
   a battery longitudinal member intersecting with the plurality of battery crossmembers,
   wherein a top surface of each battery crossmember is aligned with a top surface of the battery case, and
   wherein each of the plurality of battery crossmembers is fastened to the seat rail through a rail fastener.

7. The floor structure according to claim 6, further comprising:
   a reinforcing member received in a cavity of the seat crossmember; and
   a support bracket attached to the top surface of the center floor,
   wherein the reinforcing member is arranged above the support bracket.

8. The floor structure according to claim 7, wherein the battery case is configured to be mounted to the center floor by a through bolt and a nut,
   when the through bolt extends through the battery case,
   when the nut is interposed between the support bracket and the reinforcing member, and
   when the through bolt is configured to be screwed into the nut.

9. The floor structure according to claim 8, wherein a top end of the through bolt extends through a cavity of the reinforcing member so that the through bolt is supported to the reinforcing member.

10. The floor structure according to claim 7, wherein the reinforcing member and the seat rail are alternately arranged in a width direction of the vehicle.

11. The floor structure according to claim 1, wherein each longitudinal member includes:
    a top wall;
    a pair of sidewalls extending from both side edges of the top wall toward the center floor, respectively; and
    a pair of flanges extending from the pair of sidewalls, respectively,
    wherein the top wall has an opening, and
    wherein the pair of flanges are configured to extend toward to be in contact with the top surface of the center floor.

12. The floor structure according to claim 7, wherein the reinforcing member includes:
    a bottom wall;
    a pair of sidewalls extending from both side edges of the bottom wall toward the seat crossmember, respectively; and
    a pair of flanges extending from the pair of sidewalls, respectively, and wherein the pair of flanges are configured to extend to toward to be in contact with the seat crossmember.

* * * * *